United States Patent [19]

Fukusaki et al.

[11] 4,090,991

[45] May 23, 1978

[54] PROCESS FOR PREPARATION OF OIL-IN-WATER EMULSIONS OF VINYL POLYMERS

[75] Inventors: Hiroshi Fukusaki; Masao Niki; Yukinaga Yokota, all of Wakayama, Japan

[73] Assignee: Kao Soap Co., Ltd., Tokyo, Japan

[21] Appl. No.: 765,074

[22] Filed: Feb. 3, 1977

[30] Foreign Application Priority Data

Mar. 5, 1976 Japan .................................. 51-23977

[51] Int. Cl.$^2$ ........................ C09D 3/66; C09D 3/76; C09D 3/81
[52] U.S. Cl. ........................ 260/23 EM; 260/23 CB; 260/23 P; 260/29.2 E; 260/29.2 UA; 260/29.6 RW; 260/29.6 WB; 260/29.6 NR
[58] Field of Search ........... 260/23 P, 23 EM, 29.2 E, 260/29.2 UA, 29.6 RW, 29.6 WB, 29.6 NR, 22 CB

[56] References Cited

U.S. PATENT DOCUMENTS

| | | | |
|---|---|---|---|
| 2,992,197 | 7/1961 | Boller | 260/23 P |
| 3,189,587 | 6/1965 | Donat | 260/23 EM |
| 3,306,866 | 2/1967 | Percival et al. | 260/29.2 UA |
| 3,442,842 | 5/1969 | von Bonin | 260/29.6 WQ |
| 3,494,878 | 2/1970 | Harren et al. | 260/29.6 WB |
| 3,494,882 | 2/1970 | Andrews | 260/23 P |
| 3,989,661 | 11/1976 | Bondy | 260/23 P |
| 4,010,126 | 3/1977 | Kuzma | 260/29.6 N |

OTHER PUBLICATIONS

Chemical Abstracts, vol. 83, No. 2, Jul. 14, 1975, p. 11413b.

*Primary Examiner*—Ronald W. Griffin
*Attorney, Agent, or Firm*—Blanchard, Flynn, Thiel, Boutell & Tanis

[57] ABSTRACT

An oil-in-water emulsion of a vinyl polymer is prepared by emulsion polymerizing a vinyl monomer in the presence of a polyester having a surface active property.

9 Claims, No Drawings

PROCESS FOR PREPARATION OF OIL-IN-WATER EMULSIONS OF VINYL POLYMERS

BACKGROUND OF THE INVENTION

1. Field of the Invention

The present invention relates to a process for preparing an oil-in-water type emulsion of a vinyl-type polymer by emulsion polymerization of a polymerizable vinyl monomer and using a polyester having a surface active property as an emulsifier.

2. Description of the Prior Art

As conventional processes for the preparation of synthetic resin emulsions, there are known a process in which a monomer is emulsion-polymerized using as an emulsifier a low-molecular-weight surface active agent such as polyoxyethylene nonyl phenyl ether and a process in which emulsion polymerization is carried out by using as a protective colloid a water-soluble polymeric compound such as polyvinyl alcohol or polyvinyl pyrrolidone. In general, dry films made of synthetic resin emulsions prepared by using low molecular-weight surface active agents as emulsifiers are poor in water resistance, and the presence of the surface active agents inhibits adhesion of the films to coated substrates and/or degrades the mechanical strength of the films. In the case of emulsions obtained by the aid of a protective colloid of a water-soluble polymeric compound, the size of the dispersed particles is comparatively large, and when the emulsions are used as paint vehicles, they show poor pigment dispersibility and the resulting coatings are inferior in gloss, coloring property and adhesion to substrates.

In paints, adhesives and binders comprising organic solvents, serious problems such as pollution of air and bad effects on the health of workers are caused by the organic solvents, and recently, attempts have been made to replace the conventional solvent-type film-forming materials by aqueous-type film-forming materials. In the field of emulsion polymerization techniques, investigations have been made to utilize and develop new materials as emulsifiers. For example, Japanese Patent Application Laid-Open Specification No. 43381/74 proposed a process for the preparation of vinyl-type polymer emulsions using maleic acid-modified butadiene as an emulsifier, and Japanese Patent Application Laid-Open Specification No. 128089/74 disclosed a process for the preparation of aqueous dispersion-type resin compositions using a specific water-soluble alkyd resin as an emulsifier.

These processes, however, are defective or insufficient in various points. For example, because of the low emulsifying powers of the emulsifiers used, the conditions needed for obtaining stable emulsified polymers are severely limited. Further, the large quantities of watersoluble polymeric compounds that are used tend to increase the emulsion viscosity and make it difficult to control the flowability of the compositions.

SUMMARY OF THE INVENTION

We have discovered a process for preparing aqueous resin dispersions or emulsions which can be effectively used as paint vehicles, adhesives and binders. We synthesized polyesters possessing an excellent surface active property and discovered that when a polymerizable vinyl monomer is emulsion-polymerized, using this polymer as an emulsifier, there is obtained an oil-in-water type polymer emulsion having excellent properties as a film-forming material. Based on this finding, we have now completed the present invention.

More specifically, in accordance with the present invention, there is provided a process for the preparation of oil-in-water emulsions of vinyl-type polymers comprising emulsion-polymerizing a polymerizable vinyl monomer in the presence of an emulsifier, wherein the emulsifier is a surface active polyester having a number average molecular weight of from 1000 to 5000 and it is used in an amount of from 1 to 50% by weight, based on the total solids in the final reaction product. The surface active polyester is formed by reacting and condensing a mixed polyol component with a polyester-forming dicarboxylic acid component, said mixed polyol component consisting of (A) a polyester-forming polyol selected from the group consisting of 4,4'-bis(β-hydroxyethoxyphenyl)-2,2-propane, 4,4'-bis(β-hydroxypropoxyphenyl)-2,2-propane, a diglycidyl ether of bisphenol A, a di-β-methylglycidyl ether of bisphenol A and 2,2-bis(4-cyclohexanol)-propane and (B) a polyethylene glycol having the formula:

$$HO\text{-}(CH_2CH_2O)_n\text{-}H \quad \quad I$$

wherein $n$ is an integer of from 3 to 100, and wherein the weight ratio of the polyethylene glycol (B) to the ester-forming polyol (A) is 10 to 50%, that is, from 10 to 50 parts by weight of B per 100 parts by weight of A.

The polyester that is used as the emulsifier in the present invention is a polymer substance possessing an excellent surface active property, in which both the hydrophobic and the hydrophilic components are well balanced so as to attain the objects of the present invention. A dry film made of an emulsion obtained by using this polyester as an emulsifier has a good water resistance and because the resulting emulsion has a low viscosity and an advantageously small particle size, the emulsion is excellent in the properties required of a film-forming material, such as pigment dispersibility, gloss of the coating, adhesion of the coating to a substrate and adaptability to the coating operation.

As the polymerizable vinyl monomer that is used in the present invention, there can be mentioned, for example, acrylic acid esters and methacrylic acid esters having the following formula:

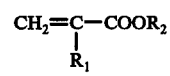

$$CH_2=C-COOR_2 \atop | \atop R_1 \quad \quad II$$

wherein $R_1$ is hydrogen or methyl, and $R_2$ is alkyl having 1 to 18 carbon atoms, glycidyl methacrylate, glycidyl acrylate, allyl acrylate, allyl methacrylate, 2-methoxyethyl acrylate, 2-ethoxyethyl acrylate, allyloxyethyl acrylate, allyloxyethyl methacrylate, γ-methacryloxypropyltrimethoxysilane, γ-methacryloxypropyl-tris(β-methoxyethoxy)-silane, vinyl acetate, styrene, vinyltoluene, vinylpyridine, butadiene, chloroprene, acrylonitrile, vinyltriethoxysilane and vinyltrimethoxysilane. These vinyl monomers are water-insoluble.

These polymerizable vinyl monomers can be used singly or in the form of a mixture of two or more of them. Moreover these vinyl monomers can be used in combination with up to 10% by weight, based on the total weight of the vinyl monomers, of water-soluble or hydrophilic vinyl monomers such as acrylic acid, methacrylic acid, itaconic acid, acrylamide, methacrylamide, dimethylaminoethyl methacrylate, N-methylol acrylamide, N-methylol methacrylamide, N-methylol acrylamide methyl ether, N-methylol methacrylamide methyl ether, 2-hydroxyethyl methacrylate, 2-hydroxypropyl methacrylate, vinylpyrrolidone and vinyltriacetoxysilane.

In the present invention, the known conventional polymerization conditions for effecting emulsion polymerization of the foregoing polymerizable vinyl monomers can be employed.

In the starting materials that are used for the preparation of the surface active polyester of the present invention, the component (A) constitutes a hydrophobic component and the component (B) constitutes a hydrophilic component. The polyester formed by condensation reaction of the mixed polyol component of (A) and (B) with the dicarboxylic acid component is different from the conventional surface active agents and is regarded as a surface active composition comprising various chemical structures. It is believed that the surface active characteristics of the resulting polyester are determined by the weight ratio of (A) and (B), the degree of polymerization of (B), that is, the value of "$n$" in formula I, the average molecular weight of the condensation product and the molecular weight distribution thereof. If the weight ratio of (B) to (A) in the starting mixed polyol component is too low, that is, the content of the non-ionic hydrophilic group is too low in the resulting polyester, even if the content of the anionic hydrophilic group is increased by introduction of, for example, a carboxyl group, the emulsion stability is poor during the emulsion polymerization step and it is difficult to obtain a stable and fine emulsion. If the weight ratio of (B) to (A) is too high, the surface active property of the polyester is also diminished and the hydrophilic polyester must be used in a larger amount for effecting polymerization of the polymerizable vinyl monomer. In this case, the water resistance and the other characteristics, that the present invention seeks to improve, are degraded in the emulsified polymer when employed as a film-forming material. When the number average molecular weight of the resulting polyester is lower than 1000, it is effective as a low-molecular-weight emulsifier but the resulting dispersed polymer, when employed as a film-forming material, is inferior in water resistance. When the number average molecular weight of the polyester is higher than 5000, the surface active property thereof is drastically degraded and it cannot be used as an emulsifier at all.

A polyester having preferred properties as the emulsifier that is used in the present invention can be obtained by maintaining the weight ratio of (B) to (A) in the range of from 10 to 50%, preferably 15 to 35%, and by using the polyester-forming dicarboxylic acid component in an amount such that the sum of the carboxyl groups of the dicarboxylic acid component is from 0.5 to 1.2 equivalents per one equivalent of the sum of the hydroxyl and glycidyl groups of (A) and (B), and performing the condensation and addition reaction so that the number average molecular weight of the resulting polyester is in the range of from 1000 to 5000.

As the dicarboxylic acid component that is reacted with the mixed polyol component consisting of (A) and (B), there can be mentioned, for example, unsaturated dibasic acids such as fumaric acid, maleic acid, maleic anhydride and itaconic acid, and other dibasic acids customarily used for polyester-forming reactions, such as phthalic acid, phthalic anhydride, succinic acid, succinic anhydride, adipic acid and sebacic acid. These dibasic acids can be used singly or in the form of a mixture of two or more of them. When a polyester containing an unsaturated dicarboxylic acid is used as an emulsifier, during the emulsion polymerization step there is formed an emulsion of an integrated polymer of the emulsifier and the vinyl-type polymer formed by copolymerization of the emulsifier and the vinyl-type monomer and/or grafting of the emulsifier onto the vinyl-type monomer acting as the backbone. As a consequence, the properties of the emulsion as a film-forming material, such as the stability of the dispersed polymer and the water resistance of the resulting dry film, are further enhanced.

In conducting the polyester-forming reaction, in addition to the foregoing starting compounds, there can be added up to 30% by weight, based on the total starting compounds, of ethylene glycol, diethylene glycol, drying oils such as linseed oil, soybean oil and safflower oil, fatty acids derived from these drying oils, tall oil, dehydrated castor oil, rice bran oil and tung oil and fatty acids derived from these oils, and polybutadienes containing ester-forming functional groups such as hydroxyl and carboxyl groups. For example, when emulsion polymerization is carried out by using a linseed oil-modified polyester as an emulsifier, there can be obtained an emulsion capable of being dried by oxidation. The polyester-forming reaction is carried out at 150° to 210° C, for several hours, with stirring, under a current of an inert gas, such as nitrogen gas, or under reduced pressure, optionally in the presence of a defoaming agent such as a silicone oil or an antioxidant inhibitor such as hydroquinone or p-methoxyphenol. The progress of the reaction can be followed and controlled by such factors as the acid value, softening point and melt viscosity of the product. In general, the reaction conditions are adjusted so that the acid value of the polyester is in the range of from 10 to 100, preferably 15 to 50, and the number average molecular weight is in the range of from 1000 to 5000.

In order to use the thus-obtained polyester as an emulsifier for emulsion polymerization, after the polyester-forming reaction has been completed, the remaining carboxyl groups are neutralized with an aqueous solution of an alkaline substance. As the alkaline neutralizer, there can be used, for example, ammonia, amines, alkanolamines, and hydroxides, oxides, carbonates and bicarbonates of alkali metals. As the amine and alkanolamine, there may be employed any primary, secondary and tertiary amines customarily used as neutralizing agents. In addition, there can be used polyamines such as diamines, triamines and tetramines, and morpholine and N-methylmorpholine. These neutralizing agents may be used singly or in the form of a mixture of two or more of them.

In the present invention, the amount of the polyester used as an emulsifier for emulsion polymerization of the polymerizable vinyl monomer is from 1 to 100% by weight, preferably 10 to 80% by weight, based on the weight of the polymerizable vinyl monomer. When the amount of the polyester used is smaller than 1% by weight, based on the vinyl monomer, the emulsifying power is insufficient and a stable and fine emulsion cannot be obtained. When the polyester is used in an amount exceeding 100% by weight, based on the vinyl monomer, the composition is ordinarily present in the form of a transparent or translucent swollen micellar solution in which the monomer is dissolved, and an increase of the viscosity or gelation is readily caused to occur during the polymerization. Therefore, the polymerization reaction must be conducted at the specified range of concentration of the polyester.

In such reaction system, normal emulsion polymerization is not allowed to advance, but after solubilization in the micelles, the vinyl monomer is grafted to the polyester in the presence of a polymerization initiator. The resulting vinyl polymer has an average molecular weight much lower than that of a polymer obtained by normal emulsion polymerization and the average molecular weight of the vinyl polymer is in the oligomer range (see the specification of Japanese Patent Application No. 105778/75).

In the present invention, the emulsion polymerization of the polymerizable vinyl monomer is carried out in water, in the presence of a polymerization initiator and the above-mentioned polyester, as an emulsifier, under agitation, at a temperature higher than the freezing point of the reaction system and lower than the boiling point thereof. In the present invention, water-soluble and oil-soluble polymerization initiators customarily used in this field can be used for performing the emulsion polymerization. For example, there can be effectively used organic and inorganic peroxides, sulfides, sulfines, sulfinic acids, sulfones, azo compounds, diazo compounds, persulfate compounds, perchlorate compounds, and water-soluble and oil-soluble redox initators. If it is desired to improve the film-forming property and evaporation of water from films made of the emulsion, there can be added to the above reaction system small amounts of lower alcohols such as methanol, ethanol and isopropanol and organic solvents such as ethylcellosolve, butylcellosolve, butylcarbitol, ethylcellosolve acetate, butyl acetate and amyl acetate.

The vinyl-type polymer emulsion prepared according to the process of the present invention can be used widely as a paint vehicle, a varnish, an adhesive, an impregnating agent, a binder and the like. A microemulsion having a dispersed particle size smaller than 0.1 $\mu$ can easily be prepared according to the present invention. When the product of the process of the present invention is used as a paint vehicle, a good pigment dispersibility can be attained and a coating film which is excellent in water resistance, gloss and adhesion to a substrate can be obtained.

The following Preparations describe illustrative processes for preparing the polyester. The following Examples describe illustrative processes for preparing the emulsions using the polyester as an emulsifier. In these Preparations and Examples, all references to "parts" mean parts by weight.

Preparation 1

A 4-neck flask equipped with a stirrer, a thermometer, a nitrogen gas inlet and a water condenser was charged with 300 parts of 4,4'-bis($\beta$-hydroxypropoxyphenyl)-2,2-propane, 104 parts of polyethylene glycol (having a number average molecular weight of 200) and 100 parts of succinic ahydride, and the reaction was carried out at 200° C for about 5 hours under a nitrogen gas current to obtain a polyester having an acid value of 23, a softening point of 54° C as measured according to the ring and ball method and a number average molecular weight of 1470.

Preparation 2

In the same manner as described in Preparation 1, 206 parts of di-$\beta$-methylglycidyl ether of bisphenol A, 34 parts of 2,2-bis(4-cyclohexanol)propane, 85 parts of polyethylene glycol (having a number average molecular weight of 1500) and 81 parts of maleic acid were reacted in the presence of 0.2 part of p-methoxyphenol at 160° C for about 4 hours to obtain a polyester having an acid value of 55, a softening point of 70° C and a number average molecular weight of 1650.

Preparation 3

Under a nitrogen gas current, 322 parts of 4,4'-bis-($\beta$-hydroxyethoxyphenyl)-2,2-propane, 88 parts of polyethylene glycol (having a number average molecular weight of 1000) and 116 parts of fumaric acid were reacted in the presence of 0.3 part of p-methoxyphenol at 200° C for about 4 hours to obtain a polyester having an acid value of 14.8, a softening point of 55° C and a number average molecular weight of 2300.

Preparation 4

In the presence of 0.2 part of hydroquinone and 0.1 part of silicone oil (Toshiba Silicone JSA 730), 280 parts of 4,4'-bis($\beta$-hydroxypropoxyphenyl)-2,2-propane, 48 parts of 2,2-bis(4-cyclohexanol)-propane, 99 parts of polyethylene glycol (having a number average molecular weight of 1000) and 116 parts of fumaric acid were reacted at 200° C for about 9 hours to obtain a polyester having an acid value of 23.2, a softening point of 55° C and a number average molecular weight of 1710.

Preparation 5

The same components as used for the reaction in Preparation 4 were reacted at 200° C for 4 hours. At this point, the acid value was 50. Then, 53 parts of linseed oil was added to the reaction mixture, and the reaction was conducted for a further period of 6 hours to obtain a linseed oil-modified polyester having an acid value of 19, a softening point of 59° C and a number average molecular weight of 2300.

Examples in which vinyl monomers were emulsion-polymerized by using the polyesters obtained in the foregoing Preparations as emulsifiers will now be described.

EXAMPLE 1

A flask equipped with a stirrer, a nitrogen gas inlet, a thermometer and a reflux condenser was charged with 30 parts of the polyester obtained in Preparation 1, and 69 parts of an aqueous solution containing 1.0 part of 28% aqueous ammonia was added to the polyester. Neutralization was conducted at 60° C under agitation, and the resulting solution was then cooled. Then, 600 parts of water was added to the solution, and a monomer mixture comprising 300 parts of butyl methacrylate and 150 parts of ethyl acrylate was gradually added to the solution and uniformly emulsified therein. The air in the reaction vessel was replaced by nitrogen gas, and then 4 parts of a 5% aqueous solution of ammonium persulfate was added to the emulsion and the polymerization reaction was carried out at about 70° C for 4 hours under agitation to obtain a homogeneous polymer emulsion having a solid content of 42 wt.%. The emulsion was coated on a glass plate and was dried. A transparent and hard film was obtained. The dried film coated on tinplate withstood 24 hours immersion in water at room temperature.

EXAMPLE 2

To 69 parts of an aqueous solution containing 2.0 parts of tri-isopropanol amine, there was added 30 parts of the polyester obtained in Preparation 4, under agitation, to effect neutralization of the polyester. The resulting solution was cooled and diluted with 30 parts of water and 30 parts of ethanol. The air in the reaction vessel was replaced by nitrogen gas, and 20 parts of an aqueous solution of a complex containing 0.3 part of sodium pyrophosphate and 0.3 part of ferrous ammonium sulfate was added and the mixture was heated at 50° C. Then 70 parts of butyl methacrylate in which 0.15 part of benzoyl peroxide was dissolved was added dropwise to the mixture over a period of 30 minutes, and then emulsion polymerization was conducted for 2 hours to obtain a stable and fine polymer emulsion having a solid content of 40 wt.% and a viscosity not exceeding 100 cps at 25° C. A dry film prepared from this emulsion possessed excellent water resistance and blocking resistance.

EXAMPLES 3 to 9

Various vinyl monomers were emulsion-polymerized by using as an emulsifier the polyester prepared in Preparation 5, which was neutralized with morpholine or triisopropanol amine (TIPA). The compositions, preparation conditions and properties of resulting polymer emulsions are shown in Table 1.

The viscosity of the resulting polymer emulsion was measured at 25° C by using a rotary viscometer Model B. The particle size of the emulsion was an average particle size determined by fixing emulsion particles by osmium tetroxide, coloring them and observing them by a transmission type electron microscope.

EXAMPLE 10

To 100 parts of the polymer emulsion obtained in Example 4 was added as a dryer a solution formed by diluting 1.0 part of cobalt naphthenate (containing 6% cobalt) with 5.0 parts of butyl cellosolve, and the mixture was sufficiently agitated to obtain a homogeneous dispersion. The resulting dispersion was uniformly coated on a tinplate and dried. Then, the coated sample was subjected to a pencil hardness test and a dipping water resistance test according to methods described in JIS K-5400.

In the case of the sample dried for 1 day at 25° C, the pencil hardness of the coating was 5B or lower and it became cloudy white within 5 minutes when dipped in water. In the case of the sample dried for 7 days, the pencil hardness was HB and clouding or blisterng did not occur when the sample was dipped in water for 96 hours.

EXAMPLE 11

The polyester prepared in Preparation 5 was neutralized with morpholine and was formed into a 20% aqueous solution. Then, 30 parts of the solution was mixed with 45 parts of titanium white (R-820) and ground for Table 1

| | | Example No. (by weight) | | | | | | |
|---|---|---|---|---|---|---|---|---|
| | | 3 | 4 | 5 | 6 | 7 | 8 | 9 |
| Emulsifier | Polyester (Preparation 5) | 30 | 30 | 30 | 30 | 30 | 30 | 30 |
| | Neutralizing agent | morpholine | TIPA | morpholine | morpholine | TIPA | morpholine | morpholine |
| | | 1.1 | 2.3 | 1.1 | 1.1 | 2.3 | 1.1 | 1.1 |
| Dispersion Medium | Water | 69 | 118 | 119 | 81 | 118 | 119 | 119 |
| | Ethanol | — | 30 | 26 | 20 | 30 | 20 | 20 |
| Monomer | Methyl acrylate | 70 | | | 35 | | | |
| | Butyl acrylate | | | | | 40 | | 41 |
| | Butyl methacrylate | | 70 | 56 | | | | |
| | Isobutyl acrylate | | | | 35 | | 11 | |
| | Lauryl methacrylate | | | 14 | | | | |
| | Vinyl acetate | | | | | 30 | | |
| | Acrylonitrile | | | | | | 59 | |
| | Styrene | †† | | †† | †† | | †† | 29 †† |
| Initiation | Redox catalyst | $H_2O_2$—Fe | APS—SBS | $H_2O_2$—Fe | $H_2O_2$—Fe | APS—SBS | $H_2O_2$—Fe | $H_2O_2$—Fe |
| Preparation Conditions | Reaction Temperature (° C) | 50 | 55 | 30 | 50 | 55 | 45 | 52 |
| | Reaction Time (min) | 120 | 60 | 120 | 120 | 60 | 120 | 120 |
| Properties of Polymer Emulsion | Solid content (wt. %) | 50 | 40 | 40 | 45 | 40 | 40 | 40 |
| | Viscosity cps/25° C | 350 | 100 | 210 | 185 | 250 | 75 | 45 |
| | Particle Size ($\mu$) | 0.2 | 0.07 | <0.05 | 0.5 | 0.2 | 0.25 | 0.1 |

Redox Catalysts in Table 1

$H_2O_2$—Fe++

10 parts of an aqueous solution containing 1.35% of ascorbic acid, 0.4 part of 30% aqueous hydrogen peroxide and 1.5 parts of a 0.1% solution of ferrous sulfate ($FeSo_4.7H_2O$) were added to the liquid mixture of the emulsifier, monomer and dispersion medium over a period of 10 minutes.

APS—SBS 1.0 part of a 10% aqueous solution of ammonium persulfate was first added, and after 10 minutes, 1.5 parts of a 10% solution of sodium hydrogensulfite was added.

16 hours in a ball mill to form a paste. Then, 75 parts of the thus-prepared milled paste was mixed with 100 parts of various polymer emulsions as described in Table 1, whereby to form a white emulsion paint. The paint was coated uniformly on a tinplate by a brush and then dried. The 60° gloss and pencil hardness thereof were tested according to the methods described in JIS K-5400 and the coating was subjected to the water resistance test (dipped in water for 96 hours) and the alkali resistance test (dipped in saturated solution of slaked lime for 18 hours) according to the synthetic resin emulsion paint test methods described in JIS K-5663. The results obtained are shown in Table 2. For comparison, a commercially available acrylic resin emulsion paint was similarly tested. In Table 2, "A" denotes that no change was observed, "B" denotes that a change was observed in the wet state but the original state was restored when the paint was dried, and "C" denotes that a change was observed and the original state was not restored even after drying.

Table 2

| Emulsion Used (Example No.) | Gloss (60°) | Dried for 1 Day | | | Dried for 7 Days | | |
|---|---|---|---|---|---|---|---|
| | | Hardness | Water Resistance | Alkali Resistance | Hardness | Water Resistance | Alkali Resistance |
| 3 | 90 | 3 B | C | C | H B | B | A |
| 5 | 80 | B | B | B | B | A | A |
| 6 | 62 | 5 B | C | C | 2 B | A | A |
| 8 | 71 | 4 B | B | B | 3 B | B | B |
| Comparison | no gloss | <6 B | B | B | <6 B | A | A |

From the results shown in Table 2, it will readily be understood that a coating that is excellent in gloss, hardness, water resistance and alkali resistance can be obtained from a polymer emulsion prepared according to the process of the present invention.

The embodiments of the invention in which an exclusive property or privilage is claimed are defined as follows:

1. A process for the preparation of oil-in-water emulsions of vinyl polymers, comprising: emulsion-polymerizing an emulsion-polymerizable vinyl monomer in the presence of from one to 50 weight percent, based on the total weight of the solids in the final reaction product, of a surface active polyester having a number average molecular weight of from 1000 to 5000, said surface active polyester having been formed by reacting and condensing a mixed polyol component with a polyester-forming dicarboxylic acid component, said mixed polyol component consisting essentially of (A) a polyester-forming polyol selected from the group consisting of 4,4'-bis(β-hydroxyethoxyphenyl)-2,2-propane, 4,4'-bis(β-hydroxypropoxyphenyl)-2,2-propane, diglycidyl ether of bisphenol A, di-β-methylglycidyl ether of bisphenol A and 2,2-bis-(4-cyclohexanol)-propane, and 10 to 50 parts by weight, per 100 parts by weight of (A), of (B) polyethylene glycol having the formula:

wherein n is an integer of from 3 to 100.

2. A process according to claim 1 wherein the emulsion polymerizable vinyl monomer is a substance selected from the group consisting of compounds having the formula:

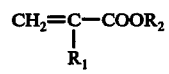

wherein $R_1$ is hydrogen or methyl, and $R_2$ is alkyl having 1 to 18 carbon atoms, glycidyl methacrylate, glycidyl acrylate, allyl acrylate, allyl methacrylate, 2-methoxyethyl acrylate, 2-ethoxyethyl acrylate, allyloxyethyl acrylate, allyloxyethyl methacrylate, γ-methacryloxypropyl-trimethoxysilane, γ-methacryloxypropyl-tris(β-methoxyethoxy)-silane, vinyl acetate, styrene, vinyltoluene, vinylpyridine, butadiene, chloroprene, acrylonitrile, vinyltriethoxysilane, vinyltrimethoxysilane and mixtures thereof.

3. A process according to claim 1 wherein the dicarboxylic acid component is a compound selected from the group consisting of fumaric acid, maleic acid, maleic anhydride, itaconic acid, phthalic acid, phthalic anhydride, succinic acid, succinic anhydride, adipic acid, sebacic acid and mixtures thereof.

4. A process according to claim 1 wherein during the condensation reaction between the mixed polyol component and the dicarboxylic acid component, there is present a member selected from the group consisting of ethylene glycol, diethylene glycol, linseed oil, soybean oil, safflower oil, tall oil, dehydrated castor oil, rice bran oil, tung oil, fatty acids derived from said oils, polybutadiene containing hydroxyl or carboxyl substituent groups, and mixtures of said members, in an amount of up to 30% by weight, based on the total amounts of said mixed polyol component and said dicarboxylic acid component.

5. A process according to claim 1 wherein said surface active polyester is used dissolved in water containing an alkaline substance as a neutralizing agent.

6. A process according to claim 2 wherein the emulsion polymerization reaction mixture contains up to 10 weight percent, based on the weight of said polymerizable vinyl monomer, of a member selected from the group consisting of acrylic acid, methacrylic acid, itaconic acid, acrylamide, methacrylamide, dimethylaminoethyl methacrylate, N-methylol acrylamide, N-methylol methacrylamide, N-methylol acrylamide methyl ether, N-methylol methacrylamide methyl ether, 2-hydroxyethyl methacrylate, 2-hydroxypropyl methacrylate, vinyl pyrrolidone, vinyl triacetoxysilane and mixtures thereof.

7. A process according to claim 1 in which the amount of B is from 15 to 35 parts by weight, per 100 parts by weight of A.

8. A process according to claim 1 in which the polyester is prepared by reacting from 0.5 to 1.2 equivalents of carboxyl group of the dicarboxylic acid component per one equivalent of the sum of hydroxyl and glycidyl groups of A and B.

9. A process according to claim 1 in which the amount of said polyester is from 10 to 80 weight percent, based on the weight of the polymerizable vinyl monomer.

* * * * *